United States Patent Office 3,447,846
Patented June 3, 1969

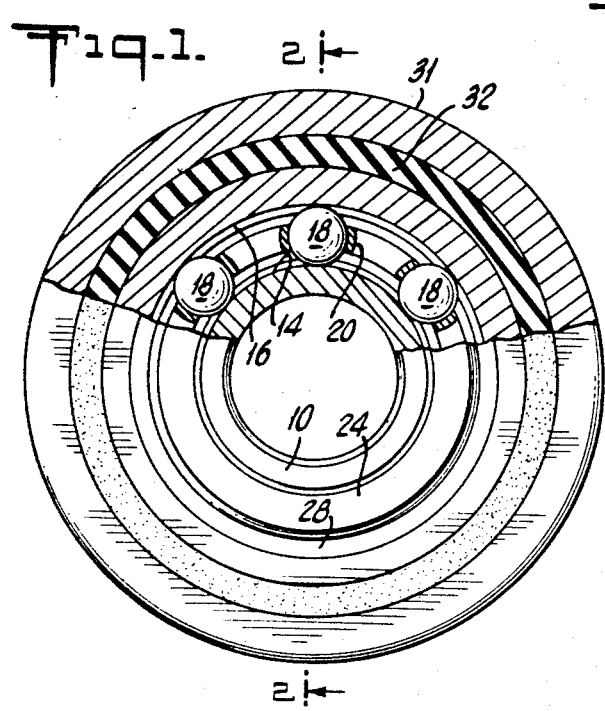
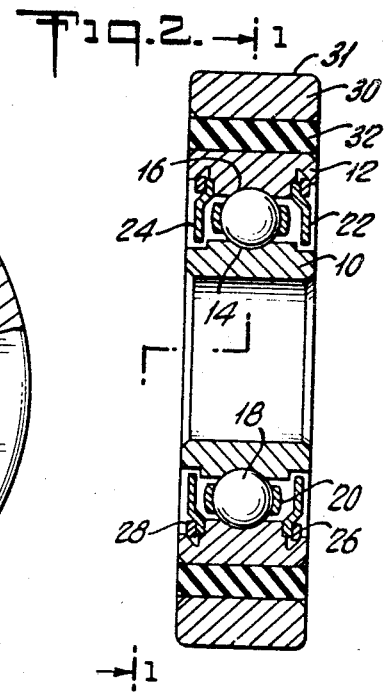
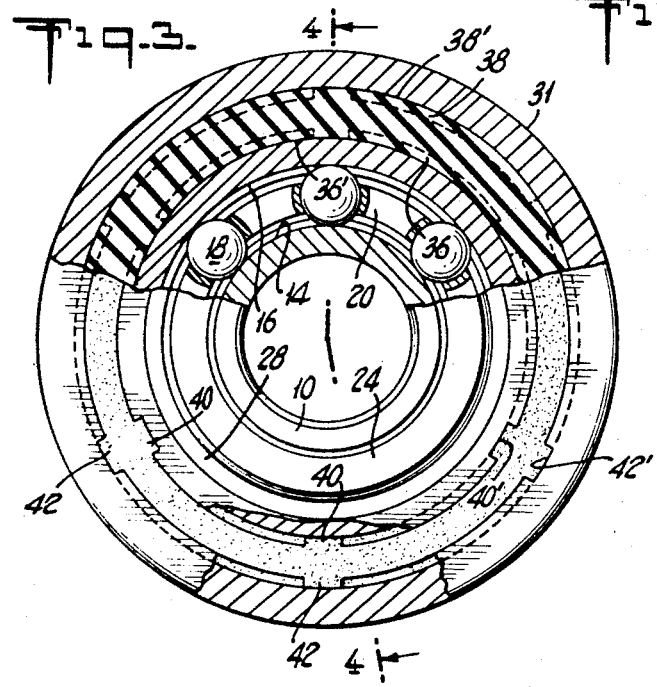
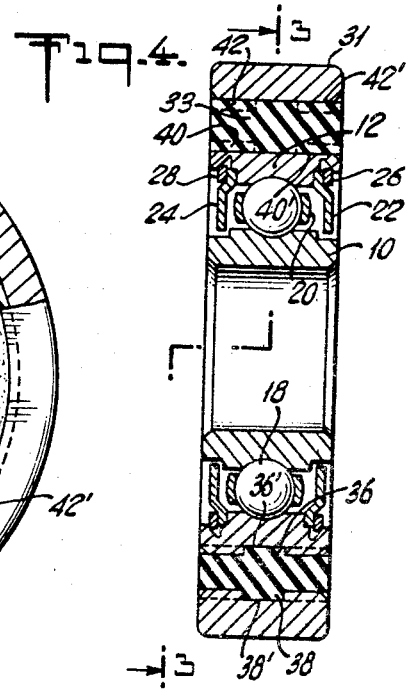
INVENTOR
DONALD R. MARSH

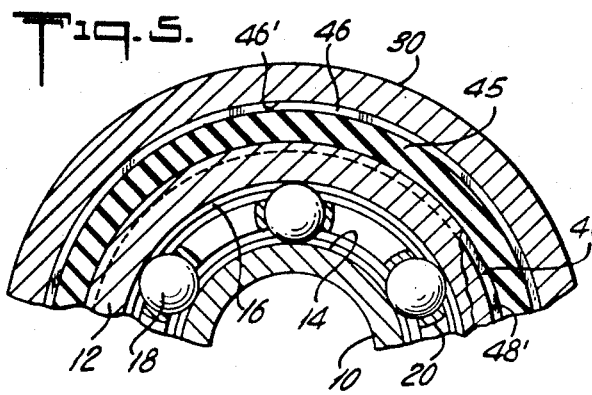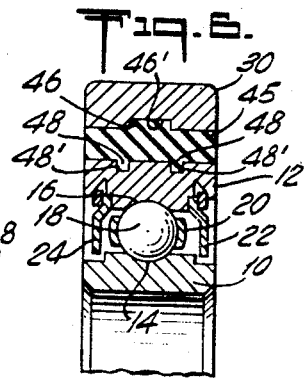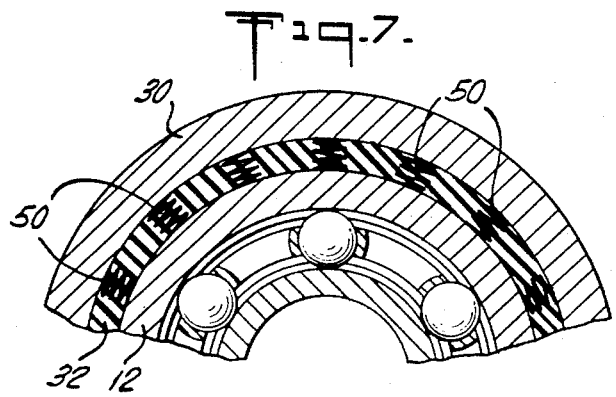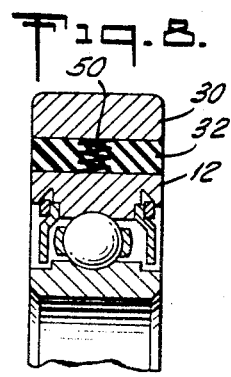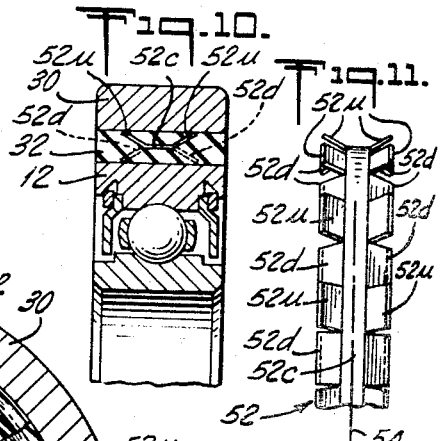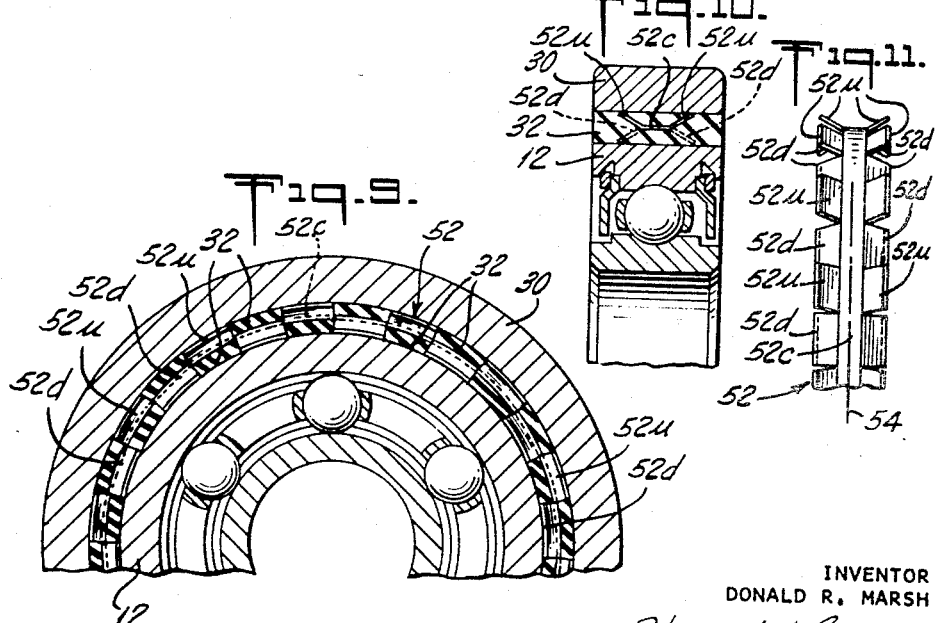

3,447,846
BEARING MOUNT ASSEMBLY
Donald R. Marsh, Westfield, Conn., assignor, by mesne assignments, to Textron, Inc., Providence, R.I., a corporation of Delaware
Original application Aug. 9, 1965, Ser. No. 478,091, now Patent No. 3,348,289, dated Oct. 24, 1967. Divided and this application Sept. 26, 1967, Ser. No. 684,082
Int. Cl. F16c 27/00
U.S. Cl. 308—184   3 Claims This is a division of application Ser. No. 478,091, filed Aug. 9, 1965 now Patent No. 3,348,289.

This invention relates to bearings, and more particularly to a novel bearing assembly wherein the bearing is mounted in a manner to produce substantial advantages not possible in the prior art.

There are a number of applications where special considerations must be given to the bearings of rotating elements, such as for example, electrical motors, in order to effect either a desirable operating condition or to prevent the development of an undesirable operating condition, due to changing conditions of operation. One example of an application of the former type is where a motor must be mounted to run as quietly as possible or to produce as little vibration as possible, as in tape recorders. An example of the latter type situation would be where the shaft of a rotating member could cause binding of its supporting bearings due to changes in the length of the shaft resulting from substantial temperature variations. Various prior art attempts have been made to solve these and similar problems, however, these arrangements have not been entirely satisfactory.

Accordingly, it is an object of this invention to provide a bearing mount assembly for a rotating member that will eliminate the problems discussed above.

Another object of the invention is to provide a bearing assembly for a rotating member which will afford substantial reduction of noise resulting from rotation thereof.

A further object is to provide an improved bearing assembly wherein the outer race is accurately positioned concentrically with respect to the outer surface of the assembly, so that the rotating member can be rotated at normal speeds in a quiet and vibrationless manner.

A still further object is to provide an improved method for making a bearing mount assembly wherein the bearing is resiliently mounted therein.

Yet another object is to provide a method whereby more accurate concentric location of the axis of rotation of a resiliently supported bearing member may be achieved.

Still another object is to provide a method for more accurately locating a resiliently supported bearing in a housing, whereby damping of noise and vibration may be achieved.

All of the objects, features and advantages of this invention and the manner of attaining them will become more apparent and the invention itself will be best understood by reference to the following description of an embodiment of the invention taken in conjunction with the accompanying drawing, in which:

FIG. 1 is a side view, partly in section, of a bearing mount assembly constructed according to the invention, FIG. 2 is a cross-section of the structure of FIG. 1 taken along the line 2—2 thereof, FIG. 3 is a side view of a further embodiment of the invention shown in FIGS. 1 and 2, FIG. 4 is a cross-section of the structure of FIG. 3 taken along the line 4—4 thereof, FIGS. 5 and 6 show a modification of the embodiment shown in FIGS. 3 and 4, FIGS. 7 and 8 illustrate a still further embodiment, FIGS. 9 and 10 show yet another embodiment, and FIG. 11 is a view illustrating a novel structure employed in the assembly of FIGS. 9 and 10.

Briefly, in accordance with an aspect of the invention, a bearing mount assembly is constructed by first mounting a bearing ring on a resilient material of selected hardness, said material being held between the bearing ring and an outer supporting member. The latter member is then preferably accurately machined so that the same may be accurately held in position while the inner surface of the bearing ring is machined in a precise manner, whereby the rotatable member which is to be supported by the bearing ring will be located in true concentric relation with respect to the outer supporting member.

Referring now to FIGS. 1 and 2, there is provide a bearing having an inner bearing ring 10 and an outer bearing ring 12, these being provided with races 14 and 16, respectively. Anti-friction elements such as balls 18 within a retainer ring 20 are provided for travel in the races in well-known manner. Bearing shields 22 and 24 are provided to prevent loss of lubrication and also to prevent the entry of dirt and foreign matter into the bearing, these being held in place by snap rings 26 and 28, respectively. The structure described thus far, i.e., the bearing, per se, is well known.

In accordance with the invention, the bearing is cushion-mounted within an assembly outer ring 30 on an intermediate layer 32 of resilient material, such as for example Buna or neoprene rubber. In the form of the invention shown in FIGS. 1 and 2, the layer 32 is preferably bonded both to the inner surface of the assembly outer ring 30 and to the outer surface of the bearing outer ring 12.

Since one of the important objects of the invention is to provide a very accurately positioned concentric axis of rotation, the outer circumferential surface 31 of the assembly outer ring 30 is first machined to close tolerances. The bearing outer ring 12 is then positioned generally concentrically within the assembly outer ring 30, while the resilient layer 32 is bonded to these rings to form a composite assembly. The particular method of bonding is not critical, and any suitable process known to those skilled in the art may be employed.

Further in accordance with the invention, the assembly outer ring 30 is then held in a race grinding machine so that the outer race 16 of the bearing may be ground. By first accurately machining the surface 31, and by grinding the outer race 16 only after the bearing outer ring 12 has been bonded to the ring by the resilient layer 32, concentric positioning of the outer race 16 with respect to the outer surface 31 can now be achieved to extremely high accuracies never before obtainable by any prior art bearing mounting arrangement wherein the bearing was simply mounted on a resilient cushion.

It will be appreciated that for any given application, the choice of both the durometer hardness rating and the relative thickness of the resilient layer 32 must be carefully chosen. If the rubber or other material 32 is too soft, substantial relative movement of the outer ring could be produced with even small dynamic imbalance of the rotatable member supported by the bearing, resulting in deflection, vibration and noise. On the other hand, if the durometer hardness rating is too high, the characteristics of the layer 32 will approach those of a rigid material such as metal, so that significant noise reduction again would not be achieved. I have found that when the layer 32 has a durometer hardness rating generally in the range of 50 to 80, the advantages of the invention are substantially realized. Durometer hardness figures outside this range may also be employed, often with some sacrifice, however, of noise reduction, depending upon the thickness and durometer hardness of the layer 32, as well as the particular application involved.

FIGS. 3 and 4 show an alternative structure according to the invention in which the resilient layer 33 is not bonded to either the bearing outer ring 12 or the assembly outer ring 30. Instead, the resilient layer 33 is provided with inner and outer annular flanges 36 and 38, respectively, and also inner and outer transverse flanges 40 and 42, respectively. These various flanges fit into mating grooves in the bearing outer ring 12 and in the assembly outer ring 30, the grooves being indicated by primed numerals corresponding in number to the flanges which they accommodate. By proper choice of the width and height of the flanges and grooves, positive gripping of the bearing outer ring 12 with respect to the assembly outer ring 30 will result so that accurate grinding of the outer race 16 with this construction can be achieved.

FIGS. 5 and 6 show a modification of the embodiment of FIGS. 3 and 4 which has manufacturing advantages thereover since transverse flanges and grooves are not employed. In this modification the resilient layer 45 includes an upper flange 46 which is preferably, though not necessarily continuous, and which is held in an accommodating groove 46', in the assembly outer ring 30. A pair of lower flanges 48 are also provided on the resilient layer 45 and here again these are preferably continuous, and are held in accommodating grooves 48' in the bearing outer ring 12. This construction also has the advantage that a bonding agent is not required between the resilient layer 45 and the rings 12 and 30, and it is more simply manufactured than that of FIGS. 3 and 4.

Conductive means such as fine wires or fabric may be associated with the resilient layer in the embodiments described, in order to provide an electrical path between the bearing outer ring 12 and the assembly outer ring 30, to prevent the buildup of an electrical charge on the rotatable member. Such conductive means will also conduct heat generated in the bearing to the assembly outer ring 30 so that the bearing will run cooler. This can be important in the construction described, particularly in high speed and high load applications, since the resilient layer reduces the transfer of heat from the bearing to the assembly outer ring 30. The conductive means can of course take various forms, and may be provided at the sides of the resilient layer, so as to pass entirely outside the same between the bearing outer ring 12 and the assembly outer ring 30.

FIGS. 7 and 8 specifically illustrate a further and novel construction in which the conductive means takes the form of generally helical springs 50. These springs 50 are spaced at intervals in the resilient layer 32 and each extends of course, into contact with both the bearing outer ring 12 and the assembly outer ring 30 so as to effectively conduct both heat and electric charges.

FIGS. 9 and 10 show a still further arrangement which utilizes a heat and charge conductive means in the form of a ring 52 of novel construction. From these figures, along with FIG. 11, it will be seen that the ring 52 comprises a central annular portion 52c with contact tabs extending from both sides thereof. The tabs are cut from a single metal blank of which the central portion 52c forms a part. The tabs 52u are bent upwardly and the tabs 52d are bent downwardly on opposite sides of the central portion 52c, as best seen in FIGS. 10 and 11. The material of which the ring 52 is formed should preferably have a mild spring characteristic so that each upper tab 52u is maintained in contact with the ring 30 and so that each lower tab 52d is maintained in contact with the ring 12, thereby providing the greatest degree of heat transfer. It will be appreciated that a half section of the ring 52, i.e. one section taken either side of the center line 54 of FIG. 11, could also be employed as an effective heat transfer structure.

Various noises originating from different sources, such as from the bearing and from slight imbalance of the rotor, are very substantially attenuated by means of this invention. Whereas in the prior art the noise could be slightly reduced, the problem of non-concentricity between the rotor and field structure of electric motors resulting from great difficulty in properly centering a resiliently mounted bearing in the motor housing, prevented desired reduction of both vibration and noise until this invention. Now by means of the structure described above, whereby an assembly is produced having an outer ring which supports the bearing on a resilient cushion, and which is accurately machined, precise concentric grinding of the bearing outer race can now be achieved in production. As a result of this and also the selected hardness of the resilient material, a substantially greater reduction of vibration and noise is produced, and measurements indicate that a noise reduction of at least 25% is now easily achieved for similar bearings of the prior art.

Further advantages are also realized from the invention in special situations. Thus, in tight applications where a press fit into a housing would ordinarily be employed for a standard bearing, the bearing mount assembly of this invention may now be employed to great advantage. In such applications, prior art bearings would frequently be radially preloaded due to the reduction in outer race diameter. With the invention, however, although extreme pressures may deform the outer ring 30 of the assembly these pressures will not be transferred through the resilient layer to cause deformation of the bearing outer ring 12 and preloading of the bearing.

Another situation where the invention results in superior operating performance is in applications where the shaft length of rotatable members are subject to substantial temperature variations. Obviously, with prior art rigidly mounted bearing emplacement, binding of the bearing could result with a relatively great amount of axial shaft expansion or contraction. With the invention, however, under these circumstances of temperature variation, the resilient layer will deflect in shear, so that binding of the bearing is not encountered. Furthermore, binding due to radial pressures resulting from temperature variations in prior art arrangements is also eliminated by using the bearing mount assembly disclosed herein. Still further advantages of reduction in brinelling and misalignment result from the various structures provided according to the invention.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:
1. A bearing comprising
 a generally rigid assembly ring having an accurately machined outer peripheral surface,
 a bearing outer ring sized to fit with annular clearance within the assembly ring,
 a mass of resilient material having a durometer hardness rating generally within the range of from 50 to 80 and being placed in the annular clearance between the bearing outer ring and the assembly ring to resiliently support the bearing outer ring within the assembly ring with the bearing outer ring having a race formed therein after support thereof by said resilient mass of material,
 an annular metallic structure having a generally annular central portion and a plurality of tabs extending therefrom,
 said annular metallic structure being sized and shaped to fit within the mass of resilient material with selected tabs contacting the bearing outer ring and assembly ring in electrical and heat conducting relationship,
 a bearing inner ring having a race, and
 antifriction elements between said bearing inner and outer rings and positioned for movement in said races.

2. The device as recited in claim 1 wherein the annular structure is provided with pairs of tabs projecting in axially opposite directions and with alternate pairs of tabs contacting the bearing and assembly rings.

3. A bearing mount assembly comprising
a generally rigid assembly ring having an accurately machined outer surface,
a bearing ring sized to fit with annular clearance in concentric relationship with the assembly ring,
a mass of resilient material having a selected hardness for resilient mounting of the bearing ring and being placed in the annular clearance between the assembly and bearing rings to resiliently support the bearing ring with the bearing ring having a race formed therein after support thereof by said mass of resilient material, and
an annular metallic structure having a generally annular central portion and a plurality of tabs extending therefrom with said annular structure being sized and shaped to fit within the mass of resilient material with selected tabs contacting the bearing and assembly ring in electrical and heat conducting relationship.

References Cited

UNITED STATES PATENTS

| | | | |
|---|---|---|---|
| 1,579,798 | 4/1926 | Vail | 308—184 |
| 2,283,839 | 5/1942 | Wright | 308—184 |

FOREIGN PATENTS

| | | |
|---|---|---|
| 525,551 | 8/1940 | Great Britain. |

MARTIN P. SCHWADRON, *Primary Examiner.*

FRANK SUSKO, *Assistant Examiner.*